United States Patent [19]

Cauvy et al.

[11] Patent Number: 5,143,147
[45] Date of Patent: Sep. 1, 1992

[54] COOLING PROCESS ASSOCIATED WITH A PROCESS EMPLOYING ANHYDROUS HYDROFLUORIC ACID

[75] Inventors: Daniel Cauvy, Bambiderstroff; Francis Couget, Striring-Wendel; Raymond Slota, Porcelette; Bernard Villemin, Verneuil En Halatte, all of France

[73] Assignee: Elf Atochem S.A., Paris, France

[21] Appl. No.: 694,306

[22] Filed: May 2, 1991

[30] Foreign Application Priority Data

May 3, 1990 [FR] France ............... 90 05579

[51] Int. Cl.⁵ ............................. F28F 23/00
[52] U.S. Cl. ........................... 165/1; 165/70; 165/104.13
[58] Field of Search ........... 165/1, 70, 104.32, 104.13

[56] References Cited

U.S. PATENT DOCUMENTS 2,309,296  1/1943  Bentley ................. 165/70
4,460,512  7/1984  Millauer et al. .
4,610,859  9/1986  Miyagawa et al. .

Primary Examiner—Albert W. Davis, Jr.
Attorney, Agent, or Firm—Millen, White & Zelano

[57] ABSTRACT

This process is intended to remove at least a part of the heat produced in at least one reaction and/or purification operation involving anhydrous HF, the cooling being performed by heat exchange with a cooling fluid circulating in a circuit which comprises at least one exchange zone (9; 10; 11) presenting a risk of leakage of HF into the cooling fluid. The fluid of this kind which is employed is an aqueous solution of at least one compound chosen from (a) strong bases, (b) the salts resulting from the combination of a strong base and of an organic or inorganic acid whose pKa is >3.5, (c) the salts of amphoteric oxides with bases, (d) compounds which, in contact with water, are converted into one of the abovementioned compounds; the said cooling fluid is circulated in a closed circuit, and the operation is carried out with a cooling fluid pressure which is lower than the pressure at which the reaction and/or the purification operation is conducted.

14 Claims, 1 Drawing Sheet 5,143,147

COOLING PROCESS ASSOCIATED WITH A PROCESS EMPLOYING ANHYDROUS HYDROFLUORIC ACID

BACKGROUND OF THE INVENTION

The present invention relates to a heat exchange process, preferably a cooling process intended to remove at least a part of the heat produced in at least one reaction and/or at least one purification operation involving hydrofluoric acid, especially anhydrous or substantially anhydrous hydrofluoric acid, the said cooling being performed by heat exchange with a cooling fluid maintained at a desired temperature and circulating in a circuit which comprises at least one exchange zone presenting a risk of leakage of hydrofluoric acid into the cooling fluid.

In a conventional cooling circuit employing water as cooling fluid, any leakage of hydrofluoric acid into the water gives rise locally, or in the whole system, to a highly corrosive situation, running the risk of endangering the life of the plant, before it has been possible to remedy the leakages. Even if the response is quick and the circuit is drained, dilute hydrofluoric acid may be trapped in regions which are difficult to purge.

The use of a nonaqueous fluid, such as oil or a Freon, instead of water, as cooling fluid, can be envisaged. The size of the exchangers then results in very high operating costs. Furthermore, in the case of leakage it becomes necessary to drain such a nonaqueous fluid containing hydrofluoric acid and there is no simple solution enabling such a fluid to be reemployed once it has been contaminated.

SUMMARY OF THE INVENTION

The present invention is aimed at overcoming these disadvantages and provides the use, for cooling, of a closed circuit of optionally demineralized water which has been subjected to a preliminary basic treatment In the case of leakage, whether local or more extensive, hydrofluoric acid will be very quickly converted into the form of one or more fluorides which are much less corrosive to materials than hydrofluoric acid. When its fluoride content becomes significant, the circuit will, of course, need to be purged; however, after precipitation of the fluorides with lime, for example, it will be possible for the water to be discharged without harm to the environment. The closed circuit of water treated in this manner will be maintained at the appropriate temperature by any known technology (exchanger cooled by an sources of negative calories, including air coolers).

Thus, the present invention provides a cooling process intended to remove at least a part of the heat produced in at least one reaction and/or at least one purification operation involving anhydrous or substantially anhydrous hydrofluoric acid, the said cooling being performed by heat exchange with a cooling fluid maintained at a desired temperature and circulating in a circuit which comprises at least one exchange zone presenting a risk of leakage of hydrofluoric acid into the cooling fluid, characterized in that:

the cooling fluid employed is an aqueous solution of at least one compound whose concentration can be up to the saturation limit and which is chosen from:
(a) strong bases;
(b) the salts resulting from the combination of a strong base and of an organic or inorganic acid whose pKa is higher than 3.5;
(c) the salts of amphoteric oxides with bases; and
(d) compounds which, in contact with water, are converted into one of the abovementioned compounds;

the said cooling fluid is circulated in a closed circuit; and the operation is carried out with a cooling fluid pressure which is lower than the pressure at which the reaction and/or the purification reaction are conducted.

As strong base (a) there may be mentioned alkali or alkaline-earth metal hydroxides such as sodium, potassium and calcium hydroxides and aliphatic quaternary ammonium hydroxides.

As salts (b) there may be mentioned the salts of a strong base, such as those indicated in the preceding section, and of an organic or inorganic acid whose pKa is higher than 3.5 and preferably higher than 7, such as acetic, carbonic, silicic and phosphoric acids. Sodium silicate, sodium phosphate and sodium carbonate may also be mentioned.

As salts (c) there may be mentioned sodium or potassium aluminates.

As compound (d) there may be mentioned alkali or alkaline-earth metal alcoholates.

Since the cooling fluid is always at a pressure which is lower than the pressure of the circuit in which the process takes place, the latter is therefore intrinsically protected in case of leakage. Furthermore, the cooling circuit, for its part, is protected against corrosion by the choice of the cooling fluid according to the invention.

In accordance with an advantageous characteristic of the process according to the invention the cooling circuit is drained when its fluoride content reaches the value capable of giving rise to corrosion in the circuit, and the precipitation of the fluorides is produced before the water is discharged without harm to the environment.

In a broader aspect of the invention, there is provided a process comprising passing a stream containing hydrofluoric acid in indirect heat exchange against a cooling fluid, the improvement comprising employing as said cooling fluid:

an aqueous solution of at least one compound which is
(a) a strong base;
(b) a salt resulting from the combination of a strong base and an acid having a pKa higher than 3.5;
(c) a salt of an amphoteric oxide with a base; or
(d) compounds which, in contact with water, are converted into one of the above mentioned compounds;

said cooling fluid is circulated in a closed circuit; and said process conducted with said cooling fluid being at a lower pressure than said stream containing hydrofluoric acid.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
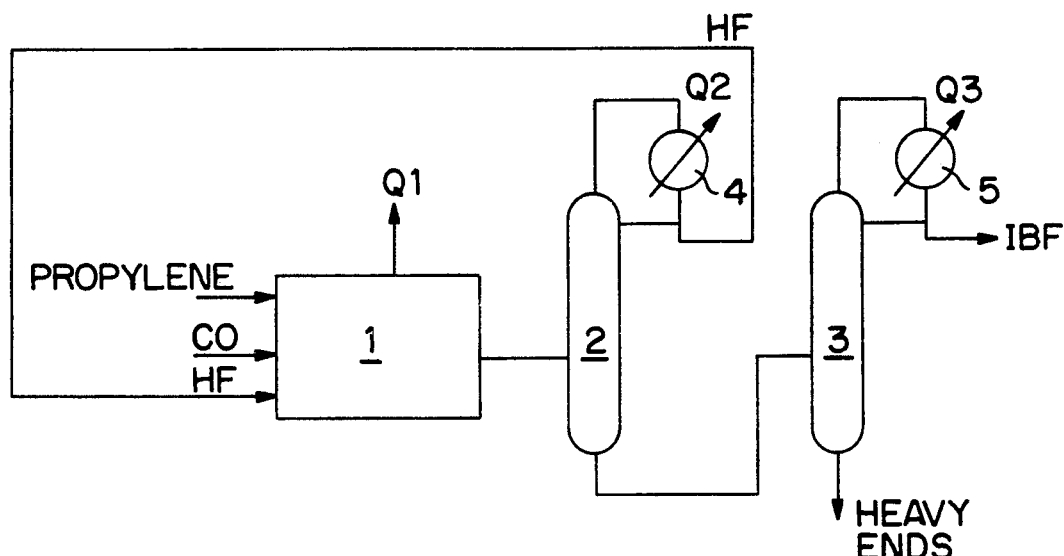
FIG. 1 is a schematic flowsheet of an example of a process employing hydrofluoric acid as a starting material.

FIG. 1 relates to the reaction of carbonylation of an alkene with carbon monoxide and anhydrous or substantially anhydrous hydrofluoric acid, in particular the manufacture of isobutyryl fluoride by the exothermic reaction, conducted at a pressure of the order of 10–200 bars, of propylene, carbon monoxide and hydrofluoric acid, the hydrofluoric acid being introduced into the reaction in excess. The actual reaction is conducted in the reactor 1, the heat of reaction Q1 having to be removed by a cooling circuit. The crude isobutyryl fluoride is sent to a first distillation column 2 in order to separate, at the head, hydrofluoric acid which is recycled, and then to a second distillation column 3 which makes it possible to separate, at the head, isobutyryl fluoride and, at the foot of the column, the heavy ends. Each of these columns, 3, 4 is associated with a condenser 4, 5, respectively, and hence quantities of heat Q2 and Q3, respectively, to be removed towards the cooling circuit.

Figure 2:
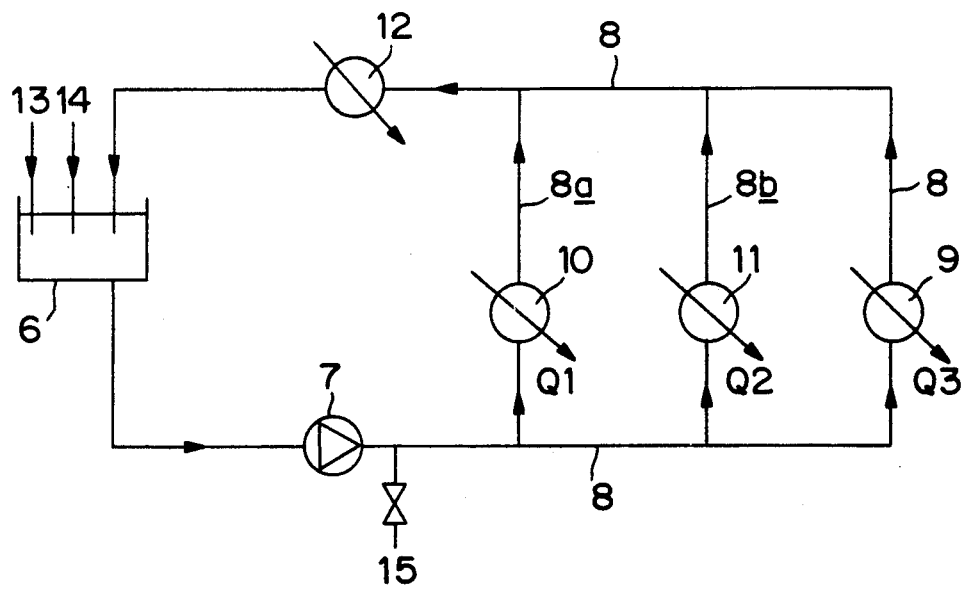
FIG. 2 is a schematic flowsheet of the cooling circuit associated with the process circuit of FIG. 1.

Referring to FIG. 2, the cooling fluid of this circuit is contained in a vessel 6 and is circulated through the plant by virtue of a recirculation pump 7. It travels in a pipe system 8, passing through a heat exchanger 9 before being returned into the vessel 6. The circuit further comprises two branches 8a, 8b comprises an exchange zone 10 and 11, respectively. The exchangers 9, 10 and 11 are those presenting the risk of leakage of hydrofluoric acid and having to remove the quantities of heat Q3, Q1 and Q2, respectively, these being defined above in relation to FIG. 1. An exchanger used to cool the primary circuit which as just been described is shown at 12, just upstream of the vessel 6. Furthermore, the optional introduction of the water treatment agent according to the invention are shown symbolically at 13 and 14. Furthermore, samples can be taken for analysis at 15.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications cited above and below, and of corresponding French Application 90 05579, filed Mar. 5, 1990, are hereby incorporated by reference.

To simulate the effects of a leakage of hydrofluoric acid towards a cooling system in the case of a process employing anhydrous hydrofluoric acid, a laboratory rig similar to that shown in FIG. 2 was constructed, except that it does not include the exchangers 9, 10 and 11. All the components of this rig are made of polypropylene. The exchanger 12 is used in this case to keep the fluid in the circuit at a constant temperature by circulating water at a controlled temperature. Furthermore, test specimens made of carbon steel and AISI 304 stainless steel, intended for measurement of the rate of corrosion in the various cases, are arranged in the vessel 6. At the end of each of the experiments described in the following Examples and comparative Examples, the thickness of the corrosion layer is measured.

EXAMPLE 1

2260 g of demineralized water are placed in the circuit. The pump is started up and 120 g (3 moles) of pure sodium hydroxide (NaOH) pellets are introduced. 50 g of an aqueous solution containing 70% of hydrofluoric acid (1.75 moles) are added over one hour. After 48 hours at 40° C. the test specimens are taken out and it is found that neither the carbon steel nor the AISI 304 stainless steel shows any trace of corrosion.

EXAMPLE 2

The procedure is as in Example 1, but in the absence of preliminary addition of sodium hydroxide. Corrosion of the test specimens is observed at the rate of 20 mm/year in the case of carbon steel and 7 mm/year in the case of AISI 304 stainless steel.

EXAMPLE 3

The rig of Example 1 is employed and 2600 g of demineralized water and 690 g of potassium carbonate $K_2CO_3$ (5 moles) are placed in the circuit 100 g of an aqueous solution containing 70% of hydrofluoric acid (3.5 moles) are added over one hour. The temperature is maintained at 40° C. for 48 hours. The corrosion of the carbon steel and AISI 304 stainless steel test specimens is so low that it cannot be measured.

EXAMPLE 4

The procedure is as in Example 3, but without addition of potassium carbonate. A corrosion of 37 mm/year and 12 mm/year is observed in the case of carbon steel and in the case of AISI 304 steel, respectively.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process comprising passing a stream containing hydrofluoric acid in indirect heat exchange against a cooling fluid, the improvement comprising employing as said cooling fluid:

an aqueous solution of at least one compound which is
  (a) a strong base;
  (b) a salt resulting from the combination of a strong base and an acid having a pKa higher than 3.5;
  (c) a salt of an amphoteric oxide with a base; or
  (d) compounds which, in contact with water, are converted into one of the abovementioned compounds;

said cooling fluid is circulated in a closed circuit; and
said process conducted with said cooling fluid being at a lower pressure than said stream containing hydrofluoric acid.

2. Process according to claim 1, wherein the strong base (a) employed is an alkali or alkaline-earth metal hydroxide or an aliphatic quaternary ammonium hydroxide.

3. Process according to claim 1, wherein the salt (b) employed is a salt of a strong base and of an acidic chosen form acetic, carbonic, silicic and phosphoric acids.

4. Process according to claim 1, wherein the salt (c) employed is a sodium or potassium aluminate.

5. Process according to claim 1, wherein an alkali or alkaline-earth metal alcoholate is employed as compound (d).

6. A process according to claim 1, further comprising measuring the closed cooling circuit to determine any fluoride content present therein, draining the cooling circuit when a predetermined content of fluoride is determined; adding a precipitating agent to resultant drained cooling fluid to precipitate fluoride; separating said precipitate from said cooling fluid, and passing resultant fluoride-removed cooling fluid to waste.

7. A process according to claim 1, wherein the stream containing hydrofluoric acid is a process stream in a process for the carbonylation of an alkene with carbon monoxide and hydrofluoric acid.

8. A cooling process intended to remove at least a part of the heat produced in at least one reaction and/or at least one purification operation involving anhydrous or substantially anhydrous hydrofluoric acid, the said cooling being performed by heat exchange with a cooling fluid maintained at a desired temperature and circulating in a circuit which comprises at least one exchange zone (9, 10, 11) presenting a risk of leakage of hydrofluoric acid into the cooling fluid, characterized in that:
    the cooling fluid employed is an aqueous solution of at least one compound whose concentration can be up to the saturation limit and which is chosen from:
    (a) strong bases;
    (b) the salts resulting from the combination of a strong base and of an organic or inorganic acid whose pKa is higher than 3.5;
    (c) the salts of amphoteric oxides with bases; and
    (d) compounds which, in contact with water, are converted into one of the abovementioned compounds;
    the said cooling fluid is circulated in a closed circuit; and
    the operation is carried out with a cooling fluid pressure which is lower than the pressure at which the reaction and/or the purification reaction are conducted.

9. Process according to claim 8, wherein the strong base (a) employed is an alkali or alkaline-earth metal hydroxide or an aliphatic quaternary ammonium hydroxide.

10. Process according to claim 8, wherein the salt (b) employed is a salt of a strong base and of an acid chosen form acetic, carbonic, silicic and phosphoric acids.

11. Process according to claim 8, wherein the salt (c) employed is a sodium or potassium aluminate.

12. Process according to claim 8, wherein an alkali or alkaline-earth metal alcoholate is employed as compound (d).

13. A process according to claim 8, further comprising measuring the closed cooling circuit to determine any fluoride content present therein, draining the cooling circuit when a predetermined content of fluoride is determined; adding a precipitating agent to resultant drained cooling fluid to precipitate fluoride; separating said precipitate from said cooling fluid, and passing resultant fluoride-removed cooling fluid to waste.

14. A process according to claim 8, wherein the stream containing hydrofluoric acid is a process stream in a process for the carbonylation of an alkene with carbon monoxide and hydrofluoric acid.

* * * * *